May 1, 1962 W. F. BRANNAN 3,032,214
DIRECT ACTION TAIL GATE ACTUATING MECHANISM
Filed July 22, 1957 2 Sheets-Sheet 1

INVENTOR
WALTER F. BRANNAN
BY
ATTORNEY

United States Patent Office 3,032,214
Patented May 1, 1962

3,032,214
DIRECT ACTION TAIL GATE ACTUATING
MECHANISM
Walter F. Brannan, 9247 S. Hobart, Los Angeles, Calif.
Filed July 22, 1957, Ser. No. 673,237
6 Claims. (Cl. 214—77)

My present invention relates to truck tail gate actuating mechanisms, and it relates particularly to a hydraulically operated tail gate actuating mechanism which includes a novel mount frame and in which the hydraulic cylinder pulls the tail gate lift arms directly upwardly instead of actuating the lift arms through the usual prior art direction-reversing lever.

It is well known in the art to provide hydraulic actuating means for moving a truck tail gate between a substantially horizontal position at or near the ground and a substantially horizontal position at or near the level of the truck bed. Almost all of these prior art hydraulic tail gate actuating mechanisms are fastened to the bottom of the truck frame, with the hydraulic cylinder being fastened to truss members that are attached to each side of the truck frame so that the hydraulic cylinder works in a C frame with the truck frame members forming a part thereof. Most of the remaining apparatus was mounted outside of the longitudinal truck frame members. By thus utilizing the truck frame as part of the hydraulic tail gate actuating mechanism frame in these conventional prior art device, the load carrying capacity of these devices was greatly restricted due to the likelihood of damage to the truck frame. Truck frame members often became bent when these conventional prior art hydraulic tail gate actuating mechanisms were over-loaded, resulting in expensive repairs and often resulting in permanent damage to the truck frame.

It was usually necessary to drill a number of holes through the truck frame in order to mount the conventional prior art hydraulic tail gate actuating mechanism on the truck frame, with plate members forming a part of the hydraulic actuating mechanism being bolted to the truck frame. Often as many as twelve to fourteen holes had to be drilled through the truck frame, which greatly weakened the frame. These holes are usually drilled in spite of a specific warning that is usually placed on the frame by the manufacturer of the truck chassis against drilling such holes.

During operation of these conventional prior art hydraulic tail gate actuating mechanisms which are thus bolted to the frame through holes that are drilled in the frame, substantial shear loads are placed on these bolts, whereby these bolts present a weak point in the structure of these prior art devices.

The conventional prior art hydraulic tail gate actuating mechanism included a hydraulic ram of the type which is extensible during the power stroke, this hydraulic ram normally being disposed at a relatively small angle from the horizontal (usually about 30 degrees). This hydraulic ram was pivotally mounted at its rear end to the truck frame through truss members, with the forward end of the hydraulic ram actuating a lever arm which extended forward from the lifting arm pivot, in the opposite direction from the rearwardly extending lifting arms. Thus, the force was applied through what amounted to a reversing lever arrangement rather than with a direct upward pull. This reversal of the hydraulic ram force resulted in large amounts of friction in the pivots, with substantial power losses.

This substantial friction loss in the conventional reversing type of hydraulic tail gate actuating mechanism greatly restricted the load capacity of the actuating mechanism, not only because of the increased power requirements, but particularly because of the increased stresses applied to the truck frame members and to the pivots and other parts of the actuating mechanism itself.

The relatively large friction losses in the conventional prior art tail gate actuating mechanism also in some instances restricted the size of the tail gate which could be cammed from its horizontal position up to a closed vertical position by means of a cam action closing mechanism such as that described and claimed in my co-pending application Serial No. 637,035 for "Cam Action Tail Gate Closing Mechanism," now abandoned.

The inefficiency of conventional prior art tail gate actuating mechanisms due to the large frictional losses, coupled with the utilization in these prior art actuating mechanisms of truck frame members as a part of the stressed actuating mechanism, caused the use of a relatively long hydraulic ram, with a long stroke. This long hydraulic ram required a relatively large amount of space, and also required a large capacity fluid pump and fluid supply.

Prior art hydraulic tail gate actuating mechanisms were normally both large and heavy, requiring long tail gate lift arms and parallel arms due to the length of the mechanism and the orientation and size of the hydraulic ram itself. The space required for these prior art mechanisms limited the depth of the truck bed, and made it very difficult to install these prior art devices on small trucks, such as pick-up trucks. Also, the rear wheels of the truck could not be disposed all of the way to the rear of the truck as is often desired, because of interference between the rear wheel axle and the hydraulic tail gate actuating mechanism. The bulky nature of the conventional tail gate actuating mechanism usually prevented pintle (tow) hooks from being attached directly to the truck frame, and made it necessary to apply these hooks to the tail gate lift arms, which was an awkward and inconvenient expedient.

A further problem in connection with conventional prior art hydraulic tail gate actuating mechanisms is that they were very difficult to properly install on many types of trucks, requiring many man hours for installation and adjustment.

In view of these and other problems in connection with prior art hydraulically operated tail gate actuating mechanisms, it is an object of my present invention to provide a hydraulically operated tail gate actuating mechanism in which the hydraulic cylinder applies the lifting force to the tail gate lifting arms in substantially the same direction as the arms are moving, namely, upwardly.

Another object of my present invention is to provide hydraulically operated tail gate actuating mechanism of the character described which comprises a self-contained unit which is suspended from the longitudinal truck frame members but which does not include the truck frame members as stressed parts of the actuating mechanism mount frame.

Another object of my present invention is to provide a self-contained hydraulic tail gate actuating mechanism of the character described which is relatively small and compact in size and light in weight, with the entire unit being easily mounted between the longitudinal truck frame members without requiring that any holes be drilled in the truck frame members and without requiring any other alteration of the truck frame.

Another object of my present invention is to provide a hydraulic tail gate actuating mechanism of the character described which has a minimum of friction loss and a maximum of structural rigidity, whereby greatly increased tail gate loads may be lifted thereby.

A further object of my present invention is to provide hydraulic tail gate actuating mechanism of the character described which is so compact that the truck wheels can be disposed all of the way to the rear of the truck without interference with the tail gate actuating mechanism, and whereby a maximum truck bed depth is permitted, and whereby a pintle or tow hook may be attached directly to the truck frame in the conventional manner without interference from the tail gate actuating mechanism.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and as is more particularly pointed out in the appended claims.

In the accompanying drawings, forming a part of my present specification:

Figure 1:
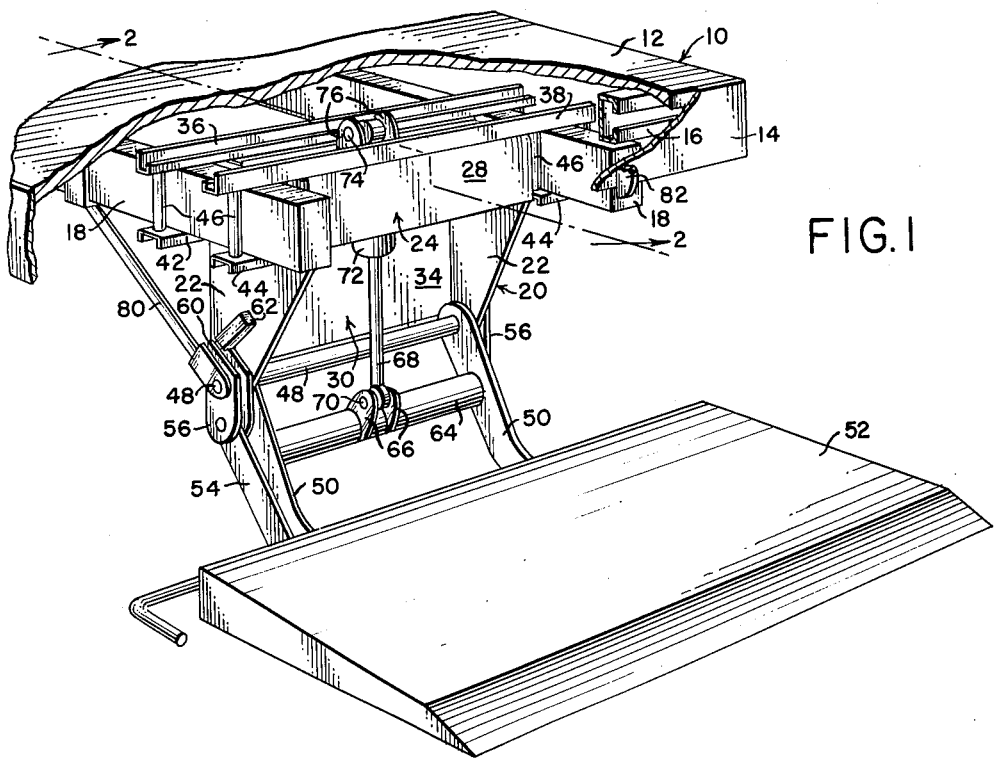
FIGURE 1 is a perspective view of the rear end of a truck embodying my present tail gate actuating mechanism, with a portion of the truck bed and sill being broken away to show the manner in which my present invention is attached to the longitudinal truck frame members.

Referring to my drawings, truck 10 embodies the usual truck floor or bed 12 with sill 14 extending downwardly from its edge.

A plurality of horizontal support members 16 are disposed laterally across the tops of the longitudinal frame members 18 of the truck, the floor or bed 12 being supported on the lateral support members 16.

My tail gate actuating mechanism mount frame comprises a box frame 20 which is inherently an extremely rigid structural device. Box frame 20 includes a pair of substantially parallel, vertical plate members 22 that are spaced apart somewhat less than the spacing between the longitudinal truck frame members 18.

A front angle member 24 is welded or riveted to the forward edges of the vertical plate members 22 and to the forward portions of the top edges of plate members 22, the front angle member 24 having a substantially horizontal top portion 26 and a generally vertically arranged portion 28 which extends downwardly from the tops of plate members 22 almost to the bottoms of plate members 22.

In similar fashion, I provide a rear angle member 30 which is welded or riveted to a part of the top edges of plate members 22 and the upper part of the rear edges of plate members 22, the rear angle member 30 being provided with a substantially horizontal top portion 32 and a substantially vertical portion 34. The substantially vertical portion 34 of rear angle member 30 is considerably shorter than the substantially vertical portion 28 of front angle member 24, leaving ample room for movement of the tail gate lift arms and parallel arms which swing upwardly between the substantially vertical plate member 22. The plate members 22 slope forwardly from the bottom of the substantially vertical portion 34 of rear angle member 30 so that the vertical plate members 22 are relatively narrow at their lower extremities, in the presently preferred embodiment of my invention.

Figure 3:
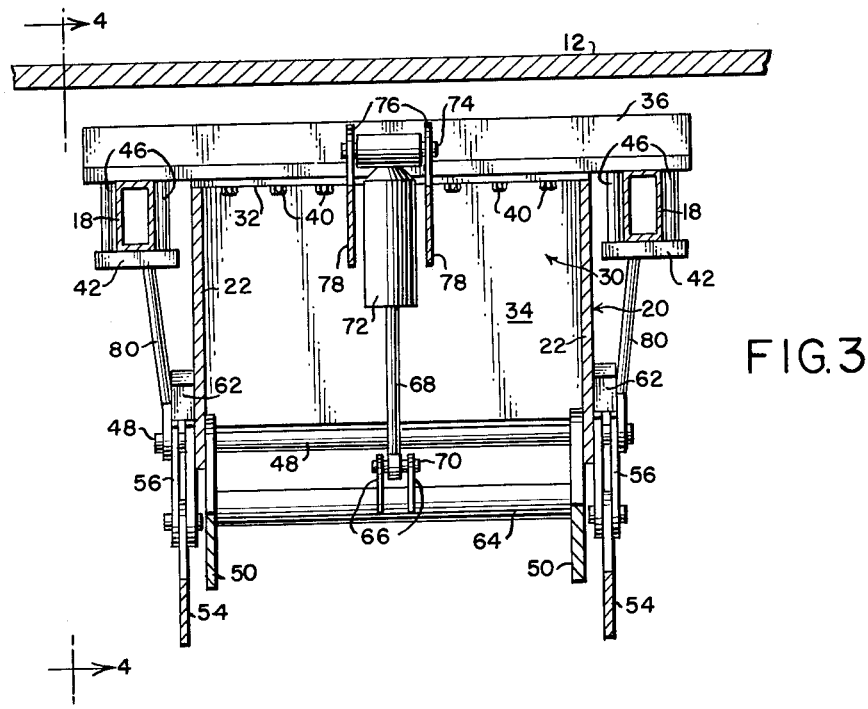
FIGURE 3 is a vertical section along the line 3—3 in FIGURE 2 further illustrating the details of construction of my present invention.

I provide a pair of substantially parallel cross-frame hanger members 36 and 38 which preferably comprise upwardly directed channel members, the hanger members 36 and 38 being attached along the respective top portions 26 and 32 of front and rear angle members 24 and 30, by means of bolts 40. The hanger members 36 and 38 may be welded to the respective angle members 24 and 30 in addition to or instead of being bolted thereto. Cross-frame hanger members 36 and 38 extend laterally past the edges of angle members 24 and 30 and the parallel vertical plate members 22 a sufficient distance so that the hanger member 36 and 38 extend laterally over the tops of the longitudinal frame members 18 in the manner best shown in FIGURES 1 and 3. In this manner, the entire box frame 20 is suspended between the longitudinal frame members 18 from the cross-frame hanger members 36 and 38, with the hanger members 36 and 38 merely resting against the top surfaces of longitudinal frame members 18.

I provide a pair of lower channel members 42, which are preferably downwardly directed and which are disposed directly beneath the end portions of front cross-frame hanger member 36 below the respective longitudinal frame members 18. Similarly, I provide a pair of relatively short lower channel members 44 which are laterally disposed directly beneath the end portions of cross-frame hanger member 38, directly below the respective longitudinal frame members 18.

The ends of cross-frame hanger members 36 and 38 extend laterally somewhat beyond the longitudinal frame members 18, and similarly the lower channel members 42 and 44 project from both sides of the longitudinal frame members 18, whereby a pair of vertical tie bolts 46 may be operatively engaged through each end portion of the cross-frame hanger member 36 along opposite sides of the respective longitudinal frame members 18 and operatively engaged through the opposite ends of the respective lower channel members 42. Similarly, tie bolts 46 are operatively engaged through the end portions of cross-frame hanger member 38 along opposite sides of the respective longitudinal frame members 18 and operatively engaged in the exposed end portions of the respective lower channel members 44.

A horizontal shaft 48 is pivotally mounted between the lower ends of the vertical plate members 22, extending outwardly slightly past each of the plate members 22, and the forward ends of the tail gate lift arms 50 are pivoted on shaft 48. The rear ends of lift arms 50 are pivotally attached to the tail gate 52 in the conventional manner.

Figure 4:
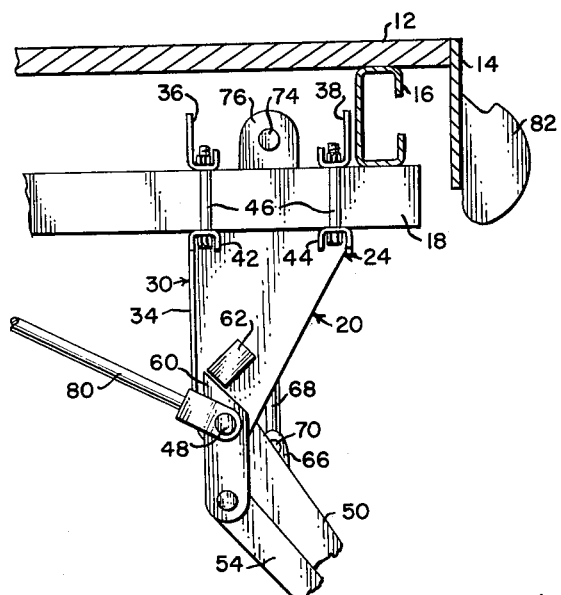
FIGURE 4 is a side elevation view of my invention, with a portion of the truck floor and sill shown in section.

I provide a pair of parallel arms 54 which are pivotally connected to one end of a pair of respective link members 56 by means of pivot pins 58, the other ends of link member 56 being pivotally mounted on the outer ends of shaft 48. I provide upward extensions 60 on link members 56 which are adapted to operatively engage respective stop lugs 62 that are fixedly mounted on the outer surfaces of plate members 22, in order to hold the link members 56 in a normally vertical position when the parallel arms 54 are urged rearwardly by the force of the tail gate 52 as it is being held in its horizontal position. The tail gate 52, lift arms 50, parallel arms 54 and link members 56 together form the necessary parallelogram to hold the tail gate 52 in its horizontal position as it is being moved between the ground and the floor or bed 12 of the truck. The ability of link members 56 to pivot anti-clockwise in FIGURE 4 about the shaft 48 permits the tail gate 52 to swing from its horizontal position up to its closed, substantially vertical position when the truck bed is to be closed off by the tail gate 52.

A cross member 64 is welded between the two lift arms 50 somewhat to the rear of shaft 48, and a pair of spaced, upwardly extending ears 66 are welded to the central part of cross member 64. A piston rod 68 is pivotally engaged between ears 66 on pivot pin 70, the piston rod 68 extending upwardly into the conventional hydraulic cylinder 72.

Figure 2:
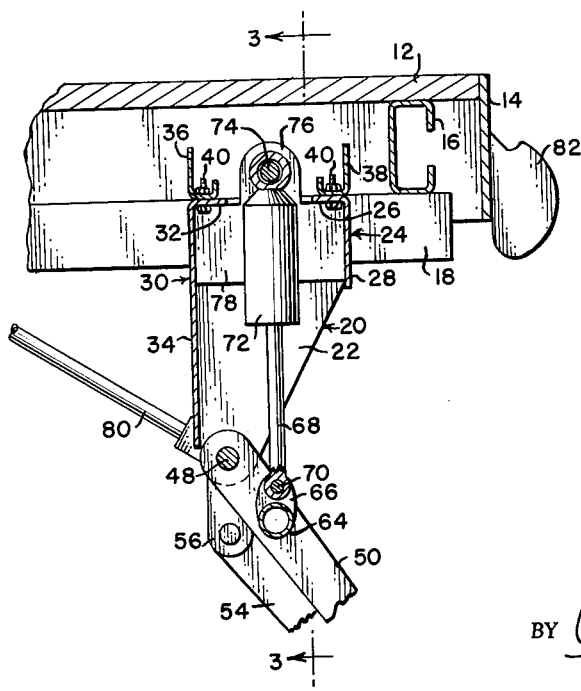
FIGURE 2 is a vertical section through the center of the truck along the line 2—2 in FIGURE 1 illustrating some of the details of construction of my present invention.

Hydraulic cylinder 72 is pivoted at its upper end on horizontal pivot pin 74 which is mounted between a pair of spaced ears 76 that extend upwardly from a pair of spaced, longitudinally arranged parallel plates 78 that are welded to the angle members 24 and 30 in the manner best shown in FIGURE 2.

Hydraulic cylinder 72 is of the type which contracts during its power stroke, with the piston rod 68 moving upwardly as hydraulic fluid under pressure is applied to cylinder 72 to swing the lift arms 50 upwardly in unison with the upward movement of piston rod 68, to raise the tail gate 52.

In order to further stabilize the mounting of my box frame 20 on the longitudinal frame members 18, I prefer to provide a pair of elongated brace members 80 which are attached at their lower, rearward ends to the exposed outer ends of shaft 48, and which are attached at their upper, forward ends to the respective longitudinal frame members 18 by any desired means, such as by means of bands which extend around the frame members 18.

My front angle member 24 may be provided in its vertical portion 28 with one or more lightening holes (not shown) which may also facilitate the mounting of a tow hook.

It will be apparent from the foregoing description and from the drawing that I have provide a hydraulic tail gate actuating mechanism which is extremely simple and compact in construction, and which may be easily attached to or removed from the ordinary truck longitudinal frame members 18 without in any way altering or permanently damaging the frame members 18 of the truck, such as by drilling.

By pivoting my hydraulic cylinder 72 and my lift arms 50 to opposite ends (vertically) of my single box frame unit 20, without separately attaching either the hydraulic cylinder 72 or the lift arms 50 to any of the truck frame members, I greatly reduce stress on the truck frame. This permits me to utilize a relatively high fluid pressure in my hydraulic cylinder 72, with a consequently relatively small fluid pump being necessary, with a correspondingly small fluid reservoir. Also, this permits me to utilize a relatively small hydraulic cylinder 72 with a relatively small amount of movement of the piston rod 68, whereby the hydraulic cylinder 72 may be disposed in its upright position within the box frame 20. Normally, the conventional, much longer prior art hydraulic cylinders had to be disposed in a generally horizontal arrangement (or about thirty degrees off with the horizontal) because of the space required to accommodate them.

By arranging my hydraulic cylinder 72 in its generally upright position as shown in the drawings, the force applied to lift arms 50 by piston rod 68 is in substantially the same direction, namely, upwardly, as the movement of the tail gate 52 which results from actuation of the hydraulic cylinder 72. In this manner, I have eliminated a large portion of the friction losses that are normally found in such hydraulic tail gate actuating devices.

I have found in practice that because of the greatly reduced friction in my present invention and the increased structural rigidity provided by my box frame 20, without involving any of the truck frame members as parts of the tail gate actuating mechanism mount frame structure, my present invention is capable of lifting an additional fifty percent weight over conventional prior art lifting mechanisms attachable to the same truck.

Also, in the lifting of heavy loads, there is practically no likelihood of bending or otherwise damaging any of the truck frame members with my present invention, whereas this is always a danger in lifting very heavy loads with conventional prior art tail gate actuating mechanisms of the type which apply the hydraulic ram force to the lift arms through a reversing lever, and which utilize portions of the truck frame members as stressed support members of the actuating mechanism.

I have also found in practice that where the hydraulic actuating mechanism is utilized to swing the tail gate about cam members 82 at the rear of the truck from the horizontal position to the upright position of the tail gate, in the manner shown, described and claimed in my co-pending application Serial No. 637,035 for "Cam Action Tail Gate Closing Mechanism," the width and weight of the tail gate that can be thus cammed from its horizontal to its upright position are sometimes seriously limited where the friction losses of conventional prior art actuating mechanisms are present. In contrast, the additional power available due to the lack of friction in my present invention permits tail gates of all conventional sizes and weights to be easily and smoothly cammed from their horizontal to their upright positions by the hydraulic actuating mechanism. The difficulty in connection with cam action tail gate closing apparatus is that when the camming action first commences as the tail gate is first moved upwardly out of its horizontal position, the upward force is applied through a very short torque arm, while the heavy weight of the tail gate is being applied downwardly through a relatively long torque arm, which means that as much power as possible should be available at this point.

My present invention is less in weight by about thirty percent than conventional tail gate actuating mechanisms, which even further decreases the stresses on the truck frame members. The compactness of my present device permits a greater truck bed depth, and also permits a pintle or tow hook to be attached directly to the rear of the truck frame, without requiring that it be attached in some manner to the lift arms as is the case with most prior art devices.

A surprising new result of my present invention is that it permits the rear wheels of the truck to be all of the way to the rear of the truck, which is often desirable, without interference between the rear axle and the tail gate actuating mechanism. Conventional prior art tail gate actuating mechanisms are so bulky that the truck wheels often cannot be placed as far as desired to the rear of the truck.

It is to be understood that the form of my invention herein shown and described is my preferred embodiment and that various changes in the shape, size and arrangement of parts may be resorted to without departing from the spirit of my invention, or the scope of my appended claims.

I claim:

1. Truck tail gate actuating mechanism including an actuating mechanism frame comprising a box frame, means for suspending said actuating mechanism frame from the truck frame, a pair of spaced tail gate lifting arms and a pair of spaced parallel arms pivotally mounted on the lower portion of said actuating mechanism frame and extending rearwardly therefrom, a truck tail gate pivotally supported on the rear ends of said lifting arms and said parallel arms, telescoping hydraulic cylinder and piston members of the type which contract when hydraulic fluid under pressure is applied thereto, said telescoping members being generally vertically oriented with one end of said telescoping members being pivotally connected to the upper portion of said actuating mechanism frame, and the other end of said telescoping members being pivotally connected to said lift arms to the rear of said lift arm pivotal mounting on said actuating mechanism frame, and selectively operable means for supplying hydraulic fluid under pressure to said hydraulic cylinder member, in which said actuating mechanism frame includes a pair of substantially parallel, substantially vertical side plate members, a front angle member having a front portion integrally connected to the forward edges of said side plates and having a top portion extending along the front part of the top edges of said side plates, and a rear angle member having a rear portion integrally attached to the rear edges of said side plates and having a top portion extending along the rear part of the top edges of said side plates, said tail gate lifting arms and parallel arms being pivoted to the lower portion of said side plate members.

2. The truck tail gate actuating mechanism of claim 1 which includes a pair of spaced suspension plate members disposed between said side plate members substantially parallel to said side plate members, said suspension plate members being integrally connected at their front edges to said front angle member and at their rear edges to said rear angle member, the upper end of said telescoping members being pivotally mounted between said suspension plate members.

3. The truck tail gate actuating mechanism of claim 2 in which a pair of parallel ears forming integral parts of said suspension plate members extend upwardly between the top portions of said front and rear angle members, the upper end of said telescoping members being pivotally mounted between said ears.

4. Truck tail gate actuating mechanism adapted to be suspended from a pair of spaced, parallel longitudinal truck frame members, including a laterally disposed cross-frame hanger member disposed laterally across the tops of said longitudinal truck frame members, an actuating mechanism frame integrally attached to said hanger member and suspended downwardly from said hanger member between said longitudinal truck frame members, a pair of spaced tail gate lifting arms and a pair of spaced parallel arms pivotally mounted on the lower portion of said actuating mechanism frame and extending rearwardly therefrom, a truck tail gate pivotally supported on the rear ends of said lifting arms and said parallel arms, telescoping hydraulic cylinder and piston members of the type which contract when hydraulic fluid under pressure is applied thereto, said telescoping members being generally vertically oriented with one end of said telescoping members being pivotally connected to the upper portion of said actuating mechanism frame, and the other end of said telescoping members being pivotally connected to said lift arms to the rear of said lift arm pivotal mounting on said actuating mechanism frame, and selectively operable means for supplying hydraulic fluid under pressure to said hydraulic cylinder member, said actuating mechanism frame including a pair of substantially parallel, substantially vertical side plate members, a front angle member having a front portion integrally attached to the forward edges of said side plates and having a top portion extending along the front part of the top edges of said side plates, and a rear angle member having a rear portion integrally attached to the rear edges of said side plates and having a top portion extending along the rear part of the top edges of said side plates, said tail gate lifting arms and parallel arms being pivoted to the lower portions of said side plate members, and said top portions of said front and rear angle members being integrally attached to the respective said cross-frame hanger members.

5. The truck tail gate actuating mechanism of claim 4 which includes a pair of spaced suspension plate members disposed between said side plate members substantially parallel to said side plate members, said suspension plate members being integrally attached at their front edges to said front angle member and at their rear edges to said rear angle member, the upper end of said telescoping members being pivotally mounted between said suspension plate members.

6. The truck tail gate actuating mechanism of claim 5 in which a pair of parallel ears forming integral parts of said suspension plate members extend upwardly between the top portions of said front and rear angle members and between said cross-frame hanger members, the upper end of said telescoping members being pivotally mounted between said ears.

References Cited in the file of this patent

UNITED STATES PATENTS

| | | |
|---|---|---|
| 2,576,881 | Kern | Nov. 27, 1951 |
| 2,725,152 | Gwinn | Nov. 29, 1955 |
| 2,774,494 | Malmstrom | Dec. 18, 1956 |
| 2,779,488 | Trotter et al. | Jan. 29, 1957 |